US008153227B2

(12) United States Patent
Stroppiana

(10) Patent No.: US 8,153,227 B2
(45) Date of Patent: Apr. 10, 2012

(54) SUBSTRATE FOR FLOORINGS SUCH AS, FOR INSTANCE, SYNTHETIC GRASS TURF, CORRESPONDING SYNTHETIC GRASS TURF AND METHODS OF MANUFACTURE

(75) Inventor: Fernando Stroppiana, Grinzane Cavour (IT)

(73) Assignee: Mondo S.p.A., Alba Frazione Gallo (Cuneo) (IT)

( * ) Notice: Subject to any disclaimer, the term of this patent is extended or adjusted under 35 U.S.C. 154(b) by 629 days.

(21) Appl. No.: 12/141,331

(22) Filed: Jun. 18, 2008

(65) Prior Publication Data

US 2009/0011152 A1    Jan. 8, 2009

(30) Foreign Application Priority Data

Jul. 6, 2007 (EP) ..................... 07425420
Nov. 30, 2007 (EP) ..................... 07425763

(51) Int. Cl.
*D04H 13/00* (2006.01)
*B32B 37/00* (2006.01)

(52) U.S. Cl. ............... 428/95; 428/17; 442/5; 442/44; 442/46; 442/226; 442/227; 156/72; 156/145; 156/283; 427/180; 427/207.1; 427/208.2

(58) Field of Classification Search .............. 442/2, 5, 442/35, 43, 44, 46, 49, 57, 58, 226, 227, 442/50; 428/95, 97; 156/61, 72, 145, 283; 427/180, 207.1, 208.2
See application file for complete search history.

(56) References Cited

U.S. PATENT DOCUMENTS

| 3,731,923 | A | | 5/1973 | Greene |
| 4,337,283 | A | | 6/1982 | Haas, Jr. |
| 4,357,386 | A | * | 11/1982 | Luciano et al. ................. 442/30 |
| 4,705,706 | A | | 11/1987 | Avery |
| 5,273,814 | A | * | 12/1993 | Kelly ............................ 442/16 |
| 5,959,527 | A | | 9/1999 | Beder et al. |
| 5,961,389 | A | | 10/1999 | Dickinson |
| 5,976,645 | A | | 11/1999 | Daluise et al. |
| 6,217,700 | B1 | * | 4/2001 | Knobel ........................ 156/296 |

(Continued)

FOREIGN PATENT DOCUMENTS

DE    4444030 A1    4/1994

(Continued)

OTHER PUBLICATIONS

European Search Report for corresponding European Application No. 07425420 dated Dec. 13, 2007.

(Continued)

*Primary Examiner* — Cheryl Juska

(74) *Attorney, Agent, or Firm* — Hesliln Rothenberg Farley & Mesiti P.C.; Victor A. Cardona, Esq.

(57) ABSTRACT

A substrate for floorings, such as synthetic grass turf includes: a pad made of a first heat-meltable material, a stabilizing mesh made of a second heat-meltable material, and a connection layer set between said pad and the mesh. The connection layer includes a third heat-meltable material with a melting point lower than the melting point of the first and of the second heat-meltable materials. The connection layer is a discontinuous layer with a granular structure, so that the substrate is permeable to liquids in order to enable, for example, draining-off of rainwater.

27 Claims, 5 Drawing Sheets

U.S. PATENT DOCUMENTS

| | | | |
|---|---|---|---|
| 6,338,885 B1 | 1/2002 | Prevost | |
| 6,723,412 B2 | 4/2004 | Prevost | |
| 6,849,565 B1 * | 2/2005 | Gardner et al. | 442/35 |
| 7,364,634 B1 * | 4/2008 | Irwin, Sr. | 156/72 |
| 7,563,498 B2 * | 7/2009 | Shimizu et al. | 428/95 |
| 2003/0152742 A1 * | 8/2003 | Shimizu et al. | 428/95 |
| 2005/0147787 A1 * | 7/2005 | Bailey et al. | 428/95 |
| 2007/0270064 A1 * | 11/2007 | Aseere | 442/150 |
| 2008/0017294 A1 * | 1/2008 | Bailey et al. | 156/72 |
| 2008/0131647 A1 * | 6/2008 | Shimizu et al. | 428/87 |

FOREIGN PATENT DOCUMENTS

| | | |
|---|---|---|
| EP | 0259940 A2 | 3/1988 |
| EP | 0377925 A1 | 7/1990 |
| EP | 1158099 A2 | 11/2001 |
| EP | 1319753 A2 | 6/2003 |
| EP | 1486613 A1 | 6/2003 |
| EP | 1371779 A1 | 12/2003 |
| EP | 1375750 A1 | 1/2004 |
| EP | 1389649 A2 | 2/2004 |
| EP | 1705292 A1 | 9/2006 |
| EP | 1726715 A1 | 11/2006 |
| EP | 1767697 A1 | 3/2007 |
| EP | 1801292 A1 | 6/2007 |
| EP | 1803841 A1 | 7/2007 |
| JP | 10037122 | 2/1998 |
| JP | 2006014994 A * | 1/2006 |

OTHER PUBLICATIONS

European Search Report from corresponding European Application No. 07425763.5 dated Jun. 4, 2008.

* cited by examiner

SUBSTRATE FOR FLOORINGS SUCH AS, FOR INSTANCE, SYNTHETIC GRASS TURF, CORRESPONDING SYNTHETIC GRASS TURF AND METHODS OF MANUFACTURE

CROSS REFERENCE TO RELATED APPLICATIONS

This application claims priority from European Patent Application No. EP 07425420.2 filed on Jul. 6, 2007 and European Patent Application No. EP 07425763.5 filed on Nov. 30, 2007.

FIELD OF THE INVENTION

The present invention relates primarily to substrates for floorings and has been developed with particular attention paid to their possible use in the production of synthetic grass turf.

The above indication is not to be interpreted as in any way limiting the scope of the invention in so far as the substrate for floorings described herein can be used also for floorings different from synthetic grass turf.

DESCRIPTION OF THE RELATED ART

Synthetic grass floorings have been used for some time now, in particular for providing areas of greenery for urban decoration and similar amenities, floorings for bordering swimming-pools and, in general, as a replacement of natural grass cover in all those conditions in which laying and maintenance of a natural grass cover may prove critical.

The use of said synthetic grass floorings has received new impulse in recent times due to their use for making turf for sports facilities, for example for soccer pitches. The corresponding literature is extremely extensive, as witnessed, at a patent level, by the following documents U.S. Pat. No. 3,731,923, U.S. Pat. No. 4,337,283, U.S. Pat. No. 5,958,527, U.S. Pat. No. 5,961,389, U.S. Pat. No. 5,976,645, JP-B-32 53 204, JP-A-10037122, DE-A-44 44 030, EP-A-0 377 925 and EP-A-1 158 099.

In particular, known from the latter document, filed in the name of the present applicant, is a structure of synthetic grass turf comprising a sheet substrate with a plurality of filiform formations extending from the substrate for simulating the grassy sward of turf and a particulate filling material or infill dispersed between the filiform formations so as to keep the filiform formations themselves in a substantially upright condition. Specifically, said structure of synthetic grass turf is characterized in that the particulate infill is formed by a substantially homogeneous mass of a granular material chosen in the group constituted by polyolefin-based materials and vinyl-polymer-based materials.

Further advantageous developments of this solution are described in the documents EP-A-1 319 753, EP-A-1 375 750, EP-A-1 371 779 and EP-A-1 486 613 and EP-A-1 803 841, all these documents being filed in the name of the present applicant.

Over the last few years, as regards its application to the production of grass turf for sports facilities, the innovative activity has chiefly been directed to the characteristics and modalities of distribution of the filling material or infill.

As a whole less attention has instead been paid to the characteristics of the yarn used for making the filiform formations. In this connection, reference may be made, for example, to the document EP-A-0 259 940, which describes, instead, the possibility of using, in a synthetic grass turf, a yarn obtained with the co-extrusion of polymeric materials of different composition, in particular with different coefficients of friction.

A solution widely adopted for making the aforesaid filiform formations envisages recourse to a yarn with a base of plastic material, such as polyethylene. The material in question is initially rolled so as to form a sheet of the thickness of, for example, 200 to 300 micron. The sheet is then subjected to an operation of cutting, which divides the sheet into a large number of strips of small width (for example, 10 to 20 mm). The operation of cutting is usually followed by one or more operations of longitudinal stretching, as well as by possible operations of fibrillation.

An alternative technique ("single-thread" technique) envisages, instead, that a material originating as a single-thread from a threading die is subjected to a process of longitudinal stretching.

Whatever the technique adopted for making it, the yarn thus obtained is wound in reels. The reels in question are then used for dispensing workstations that provide the basic structure of a synthetic grass turf of the type described previously, i.e., with the filiform formations that extend from a sheet substrate. Said workstations operate typically with known techniques that resemble tufting techniques or the like.

In particular, these techniques aim at "implanting" in the sheet substrate (which is continuous or substantially continuous, for example because it is provided with draining holes) yarn formations having a general U-shaped configuration. Each formation basically constitutes a sort of tuft with a looped part that passes underneath the substrate and two lateral branches that extend vertically above the substrate imitating blades of grass. In the case of the single thread, instead, the tuft is made up of four, six, or else eight blades, according to the thickness and/or width of the blade itself.

The operation of tufting (performed before or after implantation in the substrate) basically has the purpose of "giving more body" to the yarn and hence the tuft formed therewith. The tuft is in fact usually formed by one or more threads that tend to splay out, causing the individual tuft of synthetic grass to appear thicker and hence more similar to a tuft of natural grass. In the case of blade-like elements, the blades subjected to tufting each split up into a number of strands.

Albeit as a whole satisfactory, these traditional techniques leave room for further improvements from various points of view.

An important aspect regards the anchorage of the filiform formations to the sheetlike substrate.

A widely used technique envisages applying on the underside of the substrate (the one designed to be oriented downwards when the synthetic grass covering is laid) an aqueous dispersion of latex, such as an SBR latex. The solution in question is dried and the latex comes, so to speak, to clog or "plug" the openings for passage of the filiform formations through the sheet substrate. The action of anchorage thus achieved cannot, however, be said to be satisfactory in so far as the filiform formations may be torn away with relative ease.

Other solutions (such as for example the ones described in U.S. Pat. No. 6,338,885 or U.S. Pat. No. 6,723,412) envisage applying, once again on the underside of the substrate, strips of adhesive ribbon/material that are to anchor more firmly the looped parts of the U-shaped configurations referred to previously.

An important drawback of this technique derives from the fact that the aforesaid strips form a ribbing on the underside of the filiform substrate, which no longer rests completely on the laying foundation and ends up assuming marked directional characteristics as regards resistance to mechanical stresses.

Various documents, such as for example U.S. Pat. No. 4,705,706 or EP-A-1 705 292, envisage, according to different solutions, anchorage of the "tufts" of the filiform formations that simulate the natural grassy sward by promoting thermobonding thereof with the material of the substrate, thus applying to the production of synthetic grass floorings techniques that have been experimented in the sector of carpets and moquettes.

There remains the fact that the floorings, such as floorings for sports facilities (for instance, synthetic grass turf) must meet needs that are altogether particular, so that for example the sheet substrate of a synthetic grass turf must be able to exert a very strong action of dimensional stabilization of the corresponding synthetic grass turf in view also of the stresses to which the synthetic grass turf is subjected when used for sports activities.

For synthetic grass floorings (but also for other types of flooring for sports facilities, in particular for all floorings designed to be used out of doors) there is felt the need to have available draining substrates that are able to carry the rainwater away rapidly, preventing any formation, even just momentary, of puddles of water on the surface of the flooring.

Traditionally, the draining effect is obtained by providing, in a sheet substrate that is as a whole continuous, a regular array of drainage openings.

The presence of these drainage openings acts, however, against the function of dimensional stabilization that it is intended to achieve with the substrate.

OBJECT AND SUMMARY OF THE INVENTION

The main object of the present invention is thus to pursue various improvements in the field of substrates for floorings and of the floorings themselves, in particular as regards:
the action of stabilization of the flooring by a sheet substrate, said action being implemented in the framework of substrates that have draining characteristics, i.e., with high capacity for disposal of rainwater; and
the anchorage of the filiform formations to the substrate.

According to the present invention, that object is achieved thanks to a substrate having the characteristics recalled specifically in the ensuing claims. The invention also relates to a corresponding synthetic grass turf, as well as to corresponding methods of production.

The claims form an integral part of the disclosure of the invention provided herein.

BRIEF DESCRIPTION OF THE ANNEXED DRAWINGS

The invention will now be described, purely by way of non-limiting example, with reference to the figures of the annexed plates of drawings, in which.

DETAILED DESCRIPTION OF EXEMPLARY EMBODIMENTS

Figure 1:
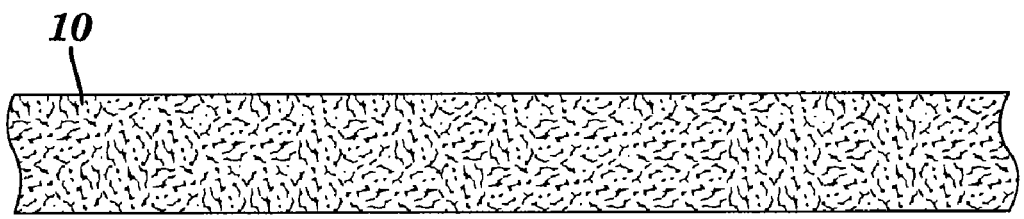
FIGS. 1 to 5 illustrate successive steps of a possible method of production of a synthetic grass turf comprising a substrate of the type described herein.

In FIG. 1 of the annexed drawings, the reference number 10 designates a pad having a thickness of approximately 3 mm and a mass per unit area (weight per unit surface) of approximately 300 g/m$^2$, with a base of polyester or PET. In the framework of the invention, there may in any case be used to advantage thicknesses of between approximately 1.5 mm (weight per unit area: approximately 150 g/m$^2$) and approximately 4 mm (weight per unit area: approximately 400 g/m$^2$) and/or any polyolefin-based material.

The term "pad" is used herein to indicate a sheet material made starting from threads, yarn, or fibres associated to one another in such a way as to:
bestow upon the pad layer 10 qualities of tensile strength such as to prevent the pad 10 from being torn in the normal conditions of use referred to in what follows; and
provide in any case empty spaces between the threads, yarn or fibres.
For example, the pad 10 can be made in the form of:
a simple-woven fabric (so as to present a weft and a warp);
a knitted fabric;
a non-woven fabric or a felt, possibly stabilized with a weft quilting.

Of course, the embodiments described above can also be combined with one another by envisaging, for example, making the pad 10 in the form of a non-woven fabric subsequently matelassé/quilted with a weft-and-warp pattern.

Where this characteristic does not already derive intrinsically from the material that constitutes it—as in the case of polyester or PET—the pad 10 can be treated (with known agents) so as to be rendered hydrophobic.

Figure 2:
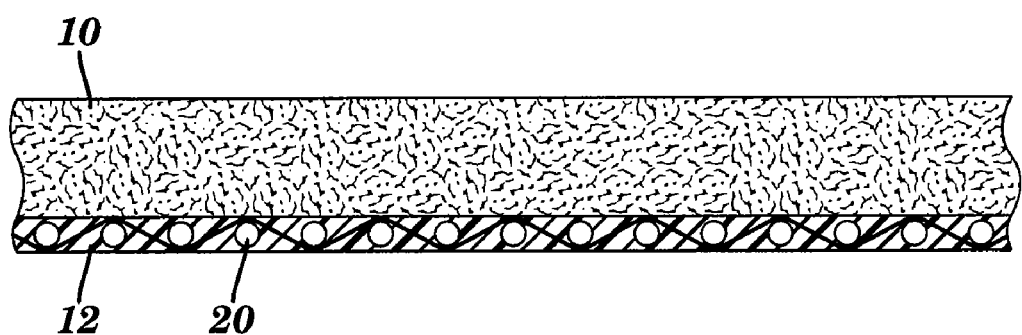

In FIG. 2, the reference number 20 designates a stabilizing mesh constituted, for example, by a mesh once again of thermoplastic, and hence heat-meltable, material, preferably a polyester with heat-fixed and stabilized mesh, with mass per unit area (weight per square meter) comprised between approximately 30 g/m$^2$ and approximately 150 g/m$^2$ (typically approximately 80-100 g/m$^2$).

Both the pad 10 and the stabilizing mesh 20 are thus formed starting from a material such as polyester, which is a thermoplastic, and hence heat-meltable, material, which typically has a melting point of approximately 240° C.

Albeit currently preferred, this choice is not, however, in itself imperative: the solution described herein is suited in fact to being implemented with a pad 10 and a stabilizing mesh 20 with a base of heat-meltable materials of a different type, hence, in general, with a first heat-meltable material having a first melting point and with a second heat-meltable material having a second melting point.

The exemplary embodiment described thus corresponds to the case where the first and second heat-meltable materials constituting the base of the pad 10 and of the mesh 20 are the same as one another. The corresponding melting points are hence also—substantially—the same: minor differences can in fact derive from the different morphology of the pad 10 and of the mesh 20.

Figure 3:
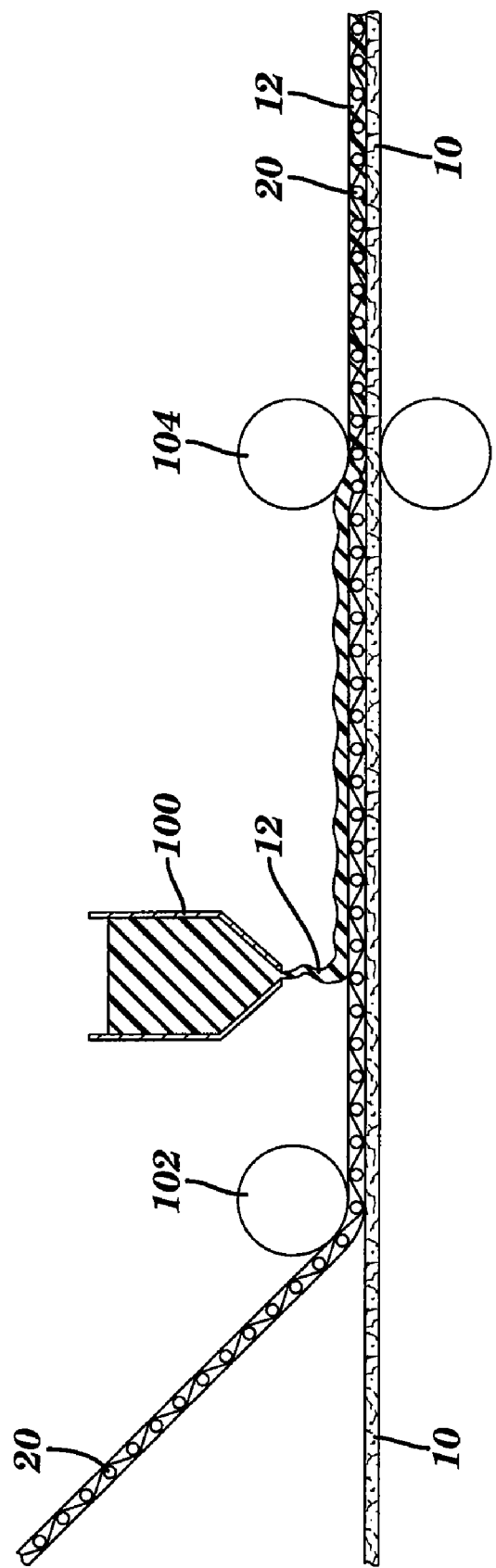

The pad 10 and the mesh 20 are coupled to one another by a connection layer 12 according to the modalities illustrated more clearly in FIG. 3.

Even though, in the final configuration of laying, to which extensive reference will be made in what follows, the mesh 20 is designed to occupy a lower position than the pad 10, the action of connection between said elements (pad 10 and mesh 20) is normally obtained by overlaying the mesh 20 on the pad 10.

In particular, in the left-hand part of FIG. 3 the pad 10 may be seen to advance (from left to right, as viewed in FIG. 3). In a station 102 (of a type in itself known, for example a roller station) the mesh 20, coming in general from above from a source of supply (not visible in the drawings but of a known type) is set resting on the pad 10.

Downstream of the station 102, set in the direction of feed of the pad 10 and of the mesh 20 is a dispensing station 100 (of a known type), which distributes, i.e., "sows" a granular thermoplastic material 12 on the top face of the mesh 20 laid on the top of the pad 10.

Preferably, said granular material is in the form of particles (with a typical grain size of approximately 500 micron) of a polyolefin material, such as polyethylene having a melting point lower than the melting points both of the material of the pad 10 and of the material of the stabilizing mesh 20.

In the example of embodiment described herein, the pad 10 and the mesh 20 have the same material as base, i.e., polyester, with a melting point of approximately 240° C., whilst the polyethylene of the granular material 12 has a melting point of approximately 120° C., hence markedly lower.

The action of "sowing" of the granular material 12 on the surface of the mesh 20 laid on top of the pad 10 is performed—according to the grain size of the material 12 itself—in such a way as to prevent an excessively dense distribution of the granular material 12: the reason for said choice will emerge more clearly from what follows.

Albeit in a less preferred way, the position of the stations 102 and 100 could be reversed, envisaging sowing of the granular material 12 on the pad 10 before the mesh 20 is laid on top of the pad.

The reference 104 designates a coupling station of a type in itself known (for example, with counter-rotating rollers, which can be replaced with an equivalent coupling/rolling device, such as an isostatic press) designed to apply to the stratified structure formed by the pad 10, the mesh 20, and the granular material 12 (typically set on top of the mesh 20, but possibly set between the pad 10 and the mesh 20) a temperature of a level intermediate between, on the one hand, the melting point or points of the pad 10 and of the mesh 20, and, on the other, the melting point of the granular material 12.

For example, in the case illustrated herein, where the pad 10 and the mesh 20 have a base of polyester (with a melting point of approximately 240° C.) and the granular material 12 has a base of polyethylene (with a melting point of approximately 120° C.), the station 104 can be regulated so as to operate at a temperature of approximately 180° C.

The application of heat in the station 104 is usually accompanied by the application of at least moderate pressure, deriving for example from the action of counter-rotating rollers.

The net effect of the aforesaid operation is to determine melting of the granular material 12, without any melting—and hence possible alteration—either of the pad 10 or of the mesh 20.

By melting and undergoing deformation, the granules of the layer 12 constitute formations of coupling between the pad 10 and the mesh 20. The coupling between the pad 10 and the mesh 20 thus obtained as a result of melting and subsequent hardening of the granules 12 can basically amount to an action of anchorage of a mechanical type rather than to an action of adhesive connection between materials (polyester and polyethylene) that are different from one another.

FIG. 2 is a schematic representation of how, when brought to the molten state, the material of the granules 12 is in fact able to penetrate into the voids defined by the individual meshes of the layer 20 and in the cavity present in the structure of the pad 10, thus exerting an action of mechanical anchorage and of firm connection of the pad 10 to the mesh 20, without there being created a real surface adhesion proper between the materials involved.

The solution of "sowing" the granular material 12 on the mesh 20 resting on the pad 10 is currently considered preferential as compared to the solution of setting the material 12 between the pad 10 and the mesh 20, in so far as, if the granular material 12 is sown on the mesh 20 resting on the pad 10, on the top face of the laminar material obtained at output from the station 104 (i.e., on the underside of the stratified structure of FIG. 2), there still remains a certain amount of heat-meltable material deriving from melting of the granules 12.

As has already been said previously, the distribution of the granules 12 is performed in a sufficiently sparse way so as to prevent the material of the granules 12 from giving rise to a continuous layer, albeit ensuring the connection between the pad 10 and the mesh 20, even though the granules 12 are not usually distributed according to a regular array and may even form agglomerates.

The fact that the layer deriving from melting of the granules 12 is not continuous, i.e., is discontinuous, with openings, causes the stratified structure constituted by the three elements 10, 20 and 12 to present characteristics of permeability to liquids, in particular to water to such an extent as to enable rapid disposal of any rainwater that might fall on the flooring, of which the substrate illustrated in FIGS. 1 and 2 forms part as foundational component.

Specifically, the experiments conducted by the present applicant show that granules made of polyethylene (such as polyethylene recycled from solid urban refuse) with an average grain size of approximately 500 micron, distributed on the pad 10 with a density of approximately 150 g/m² conserve, for the substrate 10, 20, 12 represented in FIG. 2, characteristics of permeability to water (measured according to the standard EN 12616) greater than 360 mm/h.

The above values are such that, if such a substrate is set under a tap from which there proceeds a jet of water, after a few initial instants of localized soaking, the flow of water coming from the tap runs off completely—even in the presence of a rather large flow rate—through the structure 10, 12 and 20 without stopping thereon.

Said result appears as a whole surprising and unexpected since the structure in question is a structure in which the ways of passage of water are of reduced section, such that phenomena of capillarity might be expected to be set up.

Albeit without wishing to be tied down to any specific theory in this connection, the present applicant has reasons to believe that the high degree of draining that can be achieved with the substrate 10, 20, 12 described herein may also be linked to the fact that the pad 10 and the mesh 20 are not connected adhesively (or thermo-adhesively) but by the action of anchorage obtained by the layer 12, which is in itself discontinuous, hence with openings.

It may likewise be hypothesized that the effectiveness of the action of draining is further favoured by at least one of the following factors:
- the material of the pad 10 is hydrophobic or is treated so as to have characteristics of hydrophobicity;
- the material of the pad 10 (and of the mesh 20) and the material of the granular layer 12, in addition to having different melting points, also have a different degree of surface tension (i.e., of wettability), such as to give rise, in the areas of interface, to a gradient of surface tension that is likely to favour the passage of water through the structure.

Even though at the moment the present applicant has no reason to think that said quantitative parameters have a specific importance for the purposes of achieving the aforesaid result, the present applicant has had the opportunity to note that the best performance in terms of congruence of the structure 10, 20, 12 and of draining capacity thereof are achieved when the layer 12 is obtained starting from microgranules made of polyethylene having the average grain size already previously indicated (approximately 500 micron), distributed in a pseudorandom way in a proportion of approximately 150 g/m$^2$ using a mesh layer 20 having mesh dimensions comprised between approximately 0.5×1.0 mm and approximately 2.5×4.0 mm.

Figure 4:
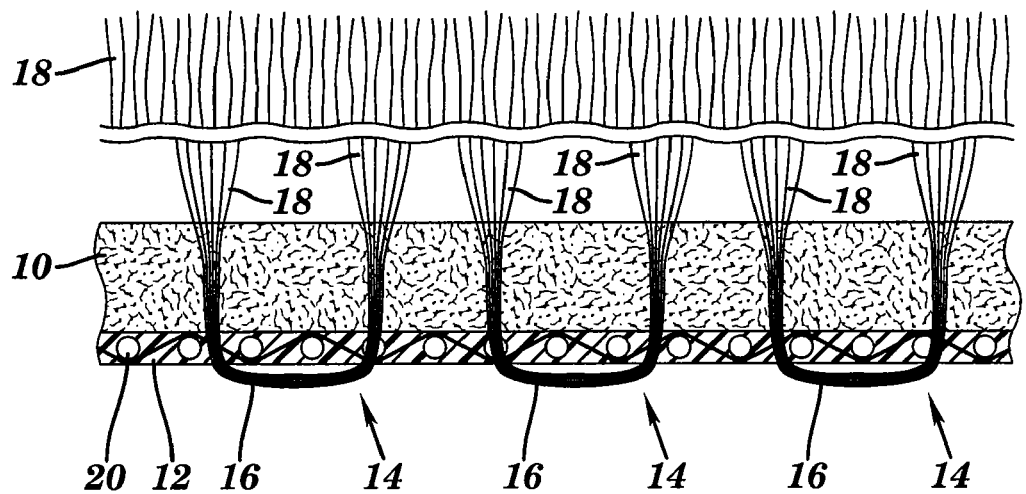

The substrate formed by the pad 10 and by the mesh 20 connected by the layer 12 may be used for the production of a synthetic grass turf according to the modalities to which FIG. 4 as a whole refers.

Specifically, the substrate 10, 12 and 20 is fed to equipment (not illustrated, but of a type in itself widely known in the sector of manufacture of the synthetic grass turf) substantially resembling a tufting machine.

The equipment in question implants in the stratified sheet substrate 10, 20, 12 yarn formations 14 having a general U-shaped configuration. Each formation basically constitutes a sort of tuft with a looped part 16 situated underneath the substrate 10, 20, 12 and two branches 18 that extend vertically above the pad 10 imitating blades of grass.

In subsequent steps of the method of manufacture of the synthetic grass turf (steps not illustrated herein, also because they are in themselves not important for the purposes of an understanding of the embodiment of the invention), the two branches 18 can be subjected to further treatments, for example tufting, curling, etc., designed to cause the yarn that make them up to reproduce in an even more faithful way the appearance of natural grass cover.

The operation of implantation of the filiform formations 14 is hence performed so that the looped parts 16 are set in close contact with the mesh 20 (with the presence of the material of the granules 12), whilst the formations 18 project from the pad 10 on the opposite side with respect to the side where the pad 10 is coupled (via the layer 12) to the mesh 20.

The yarn formations 14 comprise a thermoplastic, and hence heat-meltable, material, of a polyolefin nature, with characteristics—particularly as regards the melting point—that are identical or similar to those of the material of the granular layer 12. For example, the yarn formations 14 can be constituted by yarn made of polyethylene.

Figure 5:
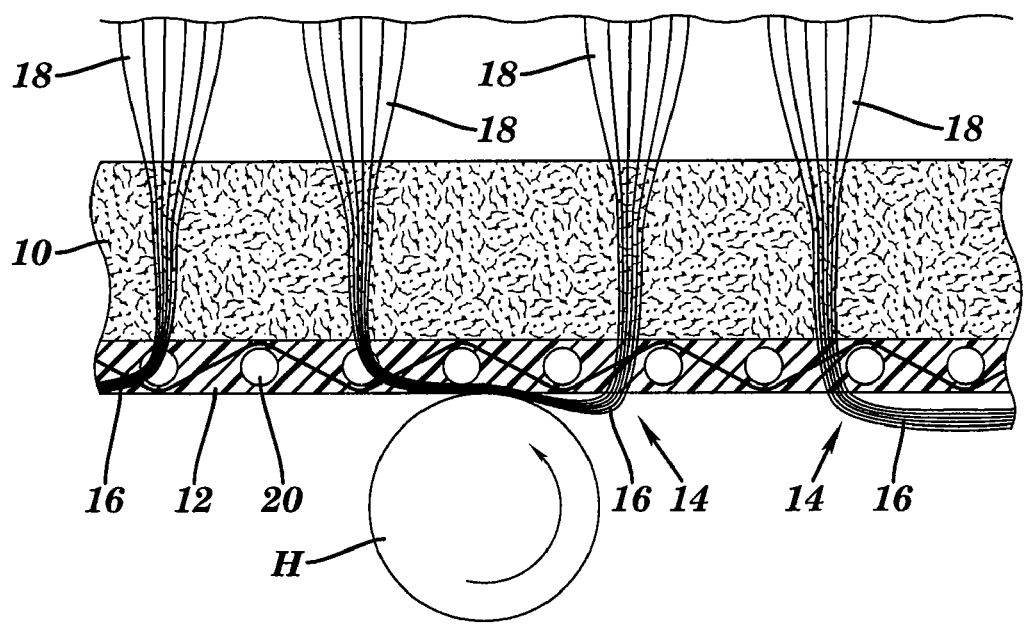

The structure of synthetic grass turf thus obtained is then subjected to the action of a heater element H (e.g., a heated plate or roller, preferably operating by contact), according to the modalities schematically represented in FIG. 5.

The heater element H operates at a temperature (for example 150° C.-190° C., typically approximately 170° C.) such as to produce localized melting—with consequent mutual bonding—of the looped parts 16 and of the material of the granular layer 12.

In particular, as a result of the action of the heater element H, the material of the granular layer 12 melts, with the dual effect of:

forming a sort of fluid bed, in which the mesh 20 is "embedded", enhancing, once said bed has consolidated, the effect of cohesion between the pad 10 and the mesh 20;
obtaining (thermo)bonding—and hence firm anchorage; of the looped parts 16 of the formations 14 and the layer of the granular material 12.

The aforesaid connection by thermobonding may be readily appreciated since (as is schematically represented in the left-hand part of FIG. 5) the looped parts 16 of the formations 14 are molten and connected in a firm way to the granular material 12 that surfaces from the mesh 20.

It will likewise be appreciated that the action of the heater element H does not induce any adverse phenomena either in the pad 10 or in the mesh 20, which are elements made of a material, such as polyester, that has a higher melting point (e.g., approximately 240° C.).

The ensemble formed by the pad 10 and by the mesh 20 (connected by the layer 12) bestows upon the sheet substrate of the synthetic grass turf excellent qualities of dimensional stability and of resistance to tensile stress, deformation, and shearing stress. Said qualities present in a practically uniform way in all directions, thus preventing said substrate (and hence the synthetic grass turf as a whole) from having any undesirable characteristics of directionality of behaviour.

At the same time, said substrate presents excellent draining characteristics, which prevents the need to create in the substrate an array of perforations that might otherwise weaken the substrate and reduce its qualities of dimensional stability.

The presence of the pad 10 causes the substrate to have a certain "body", bestowing said quality upon the corresponding synthetic grass turf also in the case where the latter has not been subsequently filled with a granular infill.

Figure 6:
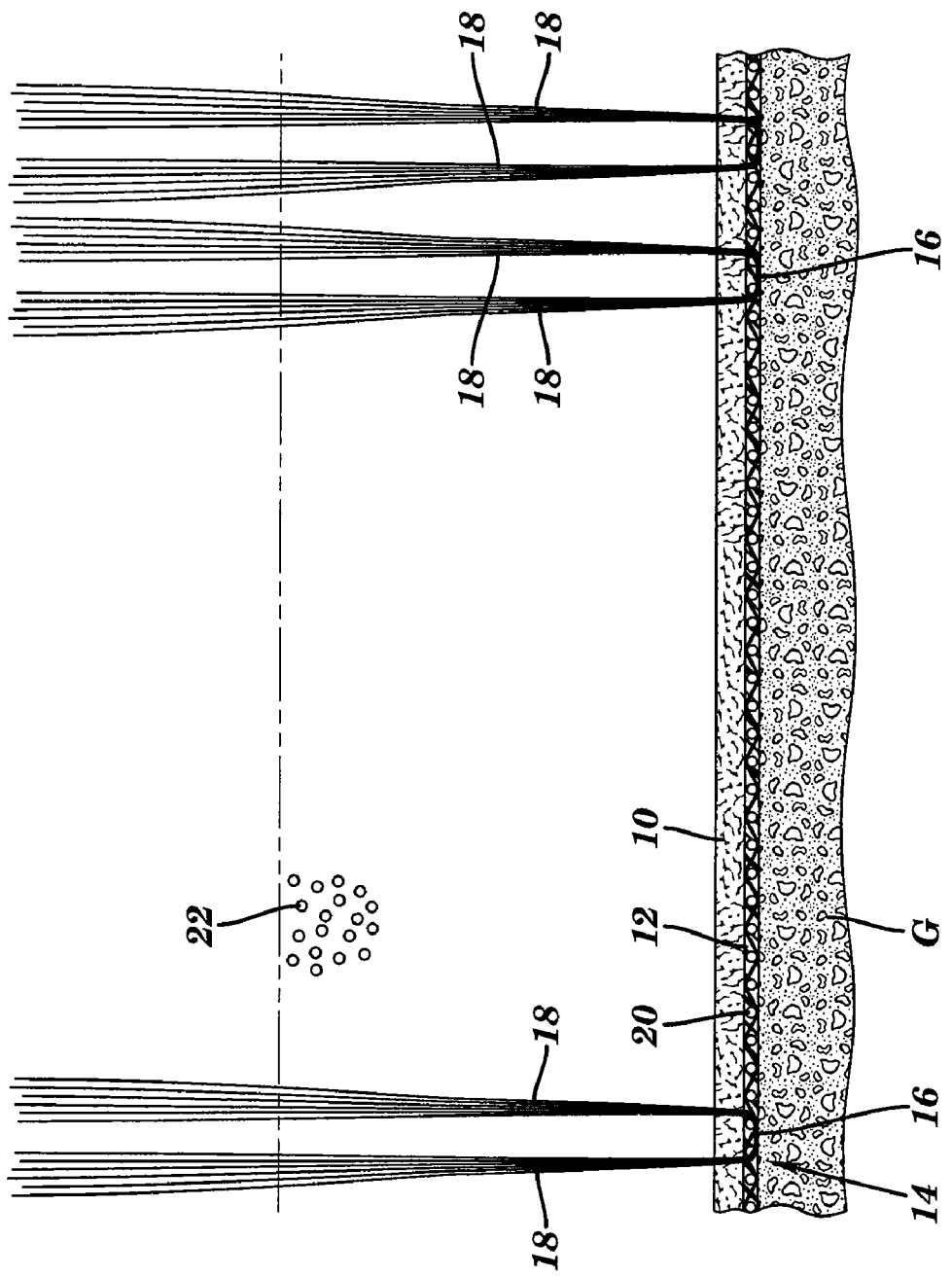
FIG. 6 is a schematic illustration of a synthetic grass turf of the type described herein integrated with an infill consisting of granular material in the typical position of laying and of final use.

As schematically illustrated in FIG. 6, the synthetic grass turf described herein may be advantageously integrated with the "sowing" of an infill material 22 formed by a granular material, for example with a polyolefin base (said term of course also comprising the so-called "thermoplastic elastomers").

In a currently particularly preferred embodiment of the invention, the aforesaid infill 22 is of the type described in EP-A-1 158 099.

Figure 7:
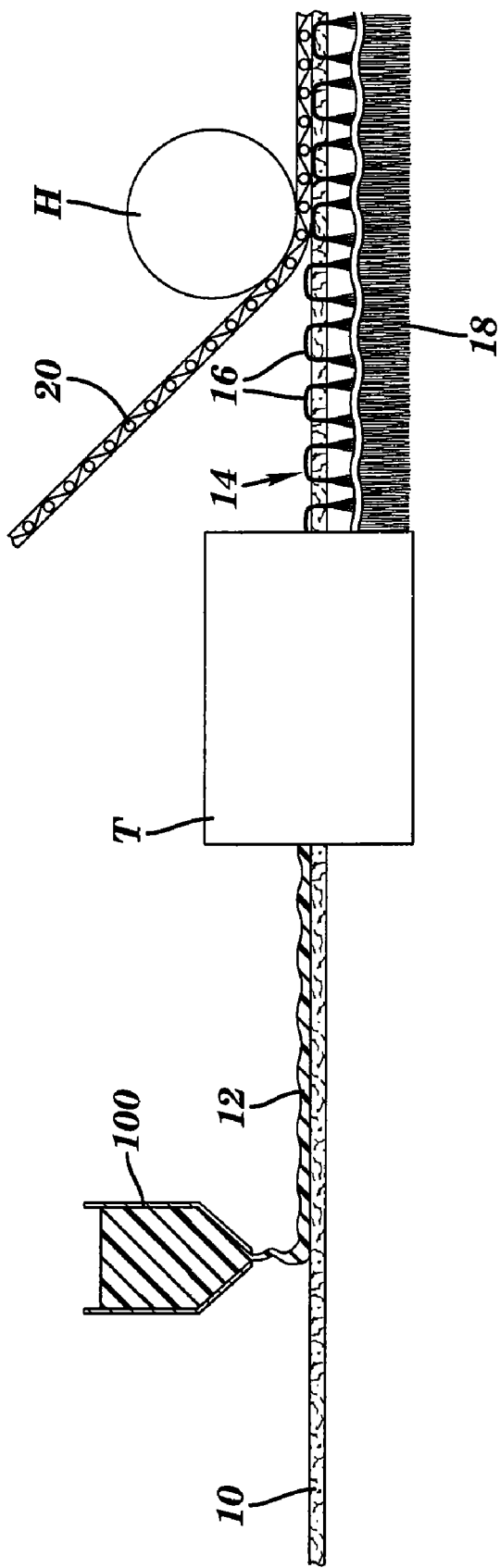
FIG. 7 is representative of a further embodiment of a method of production of a synthetic grass turf comprising a substrate of the type described herein.

FIG. 7 of the drawing is representative of another embodiment of a method for producing a substrate as described herein.

The steps of FIG. 7 will now be described by way of direct contrast to FIG. 3, with the understanding that, unless indicated differently (e.g. in connection with the mesh 20) parts or elements identical or equivalent to those already introduced in connection with FIG. 3 are indicated in FIG. 7 by using the same references.

In the left-hand part of FIG. 7 the pad 10 may be seen to advance (again from left to right, as viewed in FIG. 3) towards the dispensing station 100, which distributes, i.e., "sows" the granular thermoplastic material 12 on the top face of the pad 10. Again, the action of "sowing" of the granular material 12 on the surface of the pad 10 is performed—according to the grain size of the material 12 itself—in such a way as to prevent an excessively dense distribution of the granular material 12 in order to permit the proper draining action as described in the foregoing.

The pad 10 with the material 12 distributed thereon advances towards a processing station T substantially resembling a tufting machine. The station T (as indicated, this is equipment of a type in itself widely known in the sector of manufacture of the synthetic grass turf) implants in the stratified sheet substrate 10, 12 the yarn formations 14 having a general U-shaped configuration, each in the form of a sort of tuft with a looped part 16 intended to be situated underneath the substrate 10, 12 and two branches 18 intended to extend vertically above the pad 10 imitating blades of grass.

The terms "underneath" and "above" obviously refer to the final condition in which the synthetic grass turf is laid. In fact, while exposed to the "tufting" process in the station T, the granular material 12 will typically be in an (at least relatively) loose state, and might be undesirably dispersed if the pad 10 were to be reversed (i.e. turned upside down). Consequently, the tufting process is preferably performed in order to lead to yarn formations 14 having the looped parts 16 and the branches 18 arranged above and below the substrate 10, respectively, as schematically shown at the right-hand side of the station T in FIG. 7.

Again, the operation of implantation of the filiform formations 14 is performed so that the looped parts 16 are set in close contact with the material of the granules 12. Again, the yarn formations 14 comprise a thermoplastic, and hence heat-meltable, material, of a polyolefin nature, with characteristics—particularly as regards the melting point—that are identical or similar to those of the material of the granular layer 12; e.g. the yarn formations 14 can be constituted by yarn made of polyethylene.

The structure of synthetic grass turf thus obtained is then advanced towards a heater element H (e.g., a heated plate or roller, preferably operating by contact) where the structure of synthetic grass turf is completed by associating to the underside thereof (i.e. the side intended to face against the ground once the grass turf is laid) a mesh 20.

The mesh 20 of the embodiment of FIG. 7 differs from the mesh of the embodiment of FIG. 3, in that, while exhibiting the same basic characteristics in terms of mass per unit area, the mesh of the embodiment of FIG. 7 has a mixed structure including two different thermoplastic i.e. heat-meltable materials, namely:

a "high melting" thermoplastic material, which is substantially akin to the material of the pad 10, i.e. a heat-meltable material, preferably a polyester material, which typically has a melting point of approximately 240° C.;

a "low melting" thermoplastic material, which is substantially akin to the material of the granular layer 12a i.e. a heat-meltable material, preferably a polyolefin (e.g. polyethylene) material which typically has a melting point of approximately 120° C.

In an embodiment, the yarns extending lengthwise are of the high melting thermoplastic material (e.g. polyester) and the yarns extending crosswise are of the low melting thermoplastic material (e.g. polyethylene).

In an embodiment, the mesh is a weft-and-warp woven structure, and the weft yarns are of the high melting thermoplastic material (e.g. polyester) while the warp yarns are of the low melting thermoplastic material (e.g. polyethylene).

The heater element H operates at a temperature (for example 150° C.-190° C., typically approximately 170° C.) such as to produce localized melting—with consequent mutual bonding of:

the yarns of the mesh 20 that include the low-melting material (i.e. the polyolefin such as polyethylene);

the looped parts 16;

the material of the granular layer 12.

The net result thus obtained is again a strong connection by thermobonding of the looped parts 16 of the formations 14, the granular material 12, and the mesh 20. Again, it will be appreciated that the action of the heater element H does not induce any adverse phenomena either in the pad 10 or in those parts of the mesh 20, which are made of a material, such as polyester, that has a higher melting point (e.g., approximately 240° C.).

Again, the assembly formed by the pad 10 and by the mesh 20 connected by the layer 12 (and the looped parts 16) bestows upon the sheet substrate of the synthetic grass turf excellent qualities of dimensional stability and of resistance to tensile stress, deformation, and shearing stress. These qualities are present in a practically uniform way in all directions, thus preventing said substrate (and hence the synthetic grass turf as a whole) from having any undesirable characteristics of directionality of behaviour.

At the same time, said substrate presents excellent draining characteristics, which prevents the need to create in the substrate an array of perforations that might otherwise weaken the substrate and reduce its qualities of dimensional stability.

The presence of the pad 10 causes the substrate to have a certain "body", bestowing said quality upon the corresponding synthetic grass turf also in the case where the latter has not been subsequently filled with a granular infill.

Of course, without prejudice to the principle of the invention, the details of construction and the embodiments may vary widely with respect to what is described and illustrated herein, without thereby departing from the scope of the invention as defined by the annexed claims.

The invention claimed is:

1. A substrate for floorings, comprising:
a pad including at least one unmelted first heat-meltable material;
a stabilizing mesh comprising at least one unmelted second heat-meltable material; and
a connection layer between said pad and said mesh, said connection layer comprising a third heat-meltable material with a melting point lower than a melting point of said first meltable material and said second heat-meltable material, said connection layer connected to said mesh and said pad by melting of said third heat-meltable material to cause a mechanical connection of said mesh to said pad; and
said connection layer being a discontinuous layer formed of a plurality of granules separated from each other with openings therebetween so that said substrate is permeable to liquids through said openings;
wherein said mesh includes yarns extending lengthwise of said substrate and yarns extending crosswise of said substrate, wherein said lengthwise yarns are of said second heat-meltable material and said crosswise yarns are of a further heat-meltable material and are melted to bond said crosswise yarns to said further heat-meltable material.

2. The substrate according to claim 1, further comprising a permeability to liquids greater than 360 mm/h according to EN12616.

3. The substrate according to either claim 1 wherein said pad has a thickness comprising between about 1.5 mm and about 4 mm.

4. The substrate according to claim 1 wherein said pad has a mass per unit area comprising between about 150 g/m$^2$ and about 400 g/m$^2$.

5. The substrate according to claim 1 wherein said pad has characteristics of hydrophobicity.

6. The substrate according to claim 1 wherein said pad is subjected to a treatment of hydrophobicity.

7. The substrate according to claim 1 wherein said pad has a structure chosen between:
a simple-weave structure;
a knitted structure;
a non-woven-fabric structure;
a felt structure; and
a combination of the preceding structures.

8. The substrate according to claim 1 wherein said first and said second heat-meltable materials are the same as one another.

9. The substrate according to claim 1 wherein said first heat-meltable material is polyester.

10. The substrate according to claim 1 wherein said mesh has a mass per unit area comprised between approximately 30 g/m² and approximately 150 g/m², preferably approximately 80-100 g/m².

11. The substrate according to claim 1 wherein said mesh is a polyester mesh.

12. The substrate according to claim 1 wherein said mesh layer is a mesh structure with meshes of dimensions comprised between approximately 0.5×1 mm and approximately 2.5×4 mm.

13. The substrate according to claim 1 wherein said connection layer is formed by heat-molten granules.

14. The substrate according to claim 1 wherein said connection layer comprises polyethylene.

15. The substrate according to claim 1 wherein said connection layer has a mass per unit area of approximately 150 g/m².

16. The substrate according to claim 1 wherein said further heat-meltable material has a melting point lower than the melting point of said first and said second heat-meltable materials.

17. The substrate according to claim 16, wherein said further heat-meltable material has a melting point corresponding the melting point of said third heat-meltable material.

18. The substrate according to claim 16 wherein said further heat-meltable material is a polyolefin material.

19. The substrate according to claim 16 wherein said mesh is a weft-and-warp woven structure, wherein said weft yarns are of said second heat-meltable material and said warp yarns are of said further heat-meltable material.

20. A synthetic grass turf comprising:
a substrate according to claim 1;
filiform formations with free branches that extend from said substrate imitating natural grass cover, said filiform formations being implanted in said substrate so as to have looped parts up against a surface of said substrate opposite to said pad,
wherein said filiform formations are formed by heat-meltable material and have said looped parts thermobonded to said connection layer.

21. The synthetic grass turf according to claim 20, wherein said stabilizing mesh further comprises a further heat-meltable material having a melting point lower than the melting point of said first and said second heat-meltable materials, and wherein said filiform formations have said looped parts thermobonded to said connection layer and said further heat-meltable material of said stabilizing mesh.

22. A method for producing a substrate for floorings, comprising:
placing a stabilizing mesh comprising at least one second heat-meltable material on a pad including at least one first heat-meltable material;
sowing a plurality of granules of a third heat-meltable material on said mesh to form a connection layer, the plurality of granules separated from each other with openings therebetween so that said substrate is permeable to liquids through said openings;
applying heat to at least said connection layer at a temperature intermediate between the melting points of said first and said second heat-meltable materials and the melting point of said third heat-meltable material to melt said third heat-meltable material to cause a mechanical connection of said mesh to said pad.

23. The method according to claim 22, comprising distributing said third heat-meltable material in the form of granules with a grain size of approximately 500 micron.

24. The method according to claim 22, comprising distributing said third heat-meltable material in the form of granules in a proportion of approximately 150 g/m².

25. The method according to claim 22 wherein said third heat-meltable material is polyethylene-based.

26. The method of claim 24, further comprising:
implanting in said mesh coupled to said pad filiform formations of heat-meltable material with free branches that extend from said substrate imitating natural grass cover, said filiform formations having looped parts up against the surface of said substrate opposite to said pad; and
thermobonding said looped parts of said filiform formations to said third heat-meltable material.

27. The method according to claim 22 further comprising:
distributing said third heat-meltable material in the form of granular material on said pad;
implanting in said pad having said third heat-meltable material distributed thereon filiform formations of heat-meltable material with free branches that extend from said substrate imitating natural grass cover, said filiform formations having looped parts up against the surface of said pad having said third heat-meltable material distributed thereon,
coupling to said pad having said third heat-meltable material distributed thereon and said filiform formations implanted therein a stabilizing mesh comprising a further heat-meltable material having a melting point lower than the melting point of said first and said second heat-meltable materials, and
thermobonding said looped parts of said filiform formations to said third heat-meltable material and said further heat-meltable material in said stabilizing mesh.

* * * * *